United States Patent [19]

Okazaki et al.

[11] Patent Number: 4,909,596
[45] Date of Patent: Mar. 20, 1990

[54] OPTICAL WAVELENGTH CONVERTER MODULE

[75] Inventors: Yoji Okazaki; Koji Kamiyama; Akinori Harada; Takayuki Katoh, all of Kanagawa, Japan

[73] Assignee: Fuji Photo Film Co., Ltd., Kanagawa, Japan

[21] Appl. No.: 244,237

[22] Filed: Sep. 14, 1988

[30] Foreign Application Priority Data

Sep. 14, 1987 [JP] Japan ................................ 62-230661

[51] Int. Cl.$^4$ ........................... G02B 6/02; G02B 6/16
[52] U.S. Cl. .............................. 350/96.29; 350/96.34; 307/427
[58] Field of Search ................. 350/96.1, 96.34, 96.10; 307/427, 430

[56] References Cited

U.S. PATENT DOCUMENTS 4,536,450 8/1985 Garito ............................... 428/411.1

Primary Examiner—Frank Gonzalez
Attorney, Agent, or Firm—Sughrue, Mion, Zinn, Macpeak & Seas

[57] ABSTRACT

An optical wavelength converter module comprises a fiber type optical wavelength converter device and a light source device. The optical wavelength converter device includes a core made of a monocrystalline non-linear optical material (3,5-dimethyl-1-(4-nitrophenyl)-1,2,4-triazole). The optical material has a crystal oriented such that the b-axis thereof extends substantially along the axis of said core. The light source device applies, to the optical wavelength converter device, a fundamental which is linearly polarized in the direction of the a-axis or c-axis of said crystal which is normal to the b-axis.

8 Claims, 5 Drawing Sheets

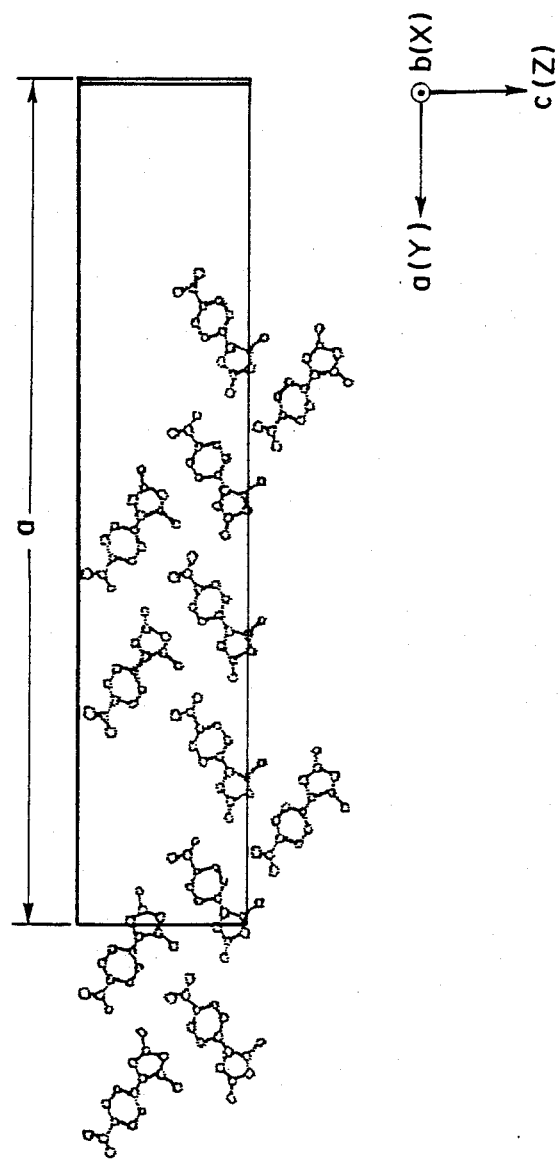

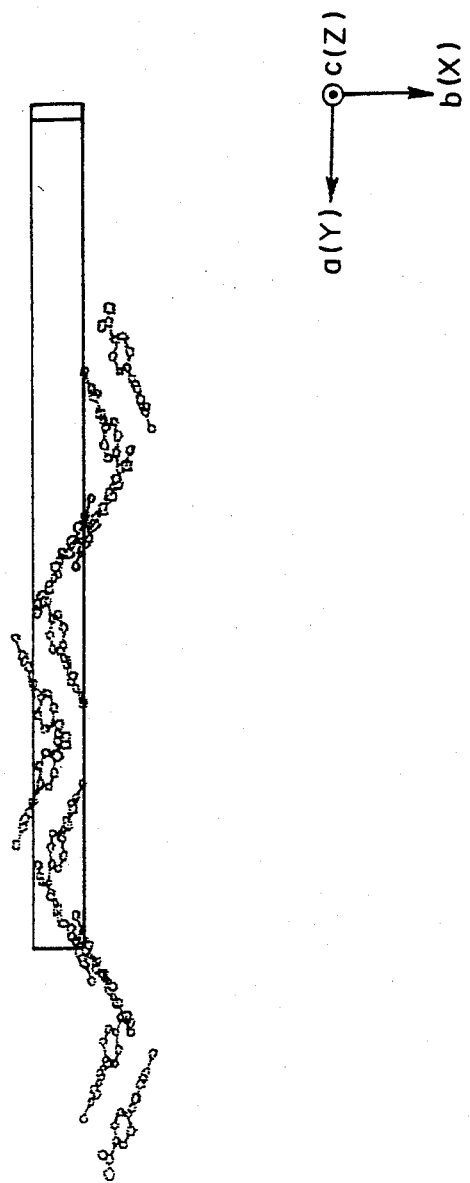

OPTICAL WAVELENGTH CONVERTER MODULE

BACKGROUND OF THE INVENTION

1. Field of the Invention

The present invention relates to an optical wavelength converter module for converting a fundamental generated by a light source to a second harmonic having a wavelength which is ½ of the wavelength of the fundamental, with an optical wavelength converter device.

2. Description of the Prior Art

Various attempts have heretofore been made for converting the wavelength of a laser beam into a shorter wavelength based on the generation of a second harmonic by a nonlinear optical material. One example of an optical wavelength converter device for effecting such laser wavelength conversion is a bulk crystal type converter device as disclosed, for example, in "Introduction to Optical Electronics" written by A. Yariv and translated by Kunio Tada and Takeshi Kamiya (published by Maruzen K. K.), pages 200-204. This optical wavelength converter device relies upon the birefringence of a crystal in order to meet phase matching conditions. Therefore, any material which does not exhibit birefringence or exhibits only small birefringence cannot be employed even if it has high nonlinearity.

A fiber type optical wavelength converter device has been proposed to solve the above problem. The optical wavelength converter device of this type is in the form of an optical fiber comprising a core made of a nonlinear optical material surrounded by cladding. One example of such an optical fiber is shown in the bulletin Vol. 3, No. 2, of the Mirooptics Research Group of a Gathering of the Applied Physics Society pages 28-32. Recently, many efforts are directed to the study of a fiber type optical wavelength converter device since it can easily gain matching between a fundamental and a second harmonic.

For increasing the wavelength conversion efficiency of the fiber type optical wavelength converter device, it is preferable to employ an optical material of high nonlinear optical constants as a core. Known optical materials of high nonlinear optical constants include MNA(2-methyl-4-nitroaniline) disclosed in Japanese Laid-Open Patent Publication No. 60-250334, NPP(N-(4-nitrophenyl)-L-prolinol), NPAN(N-(4-nitrophenyl)-N-methylaminoacetonitrile), and the like disclosed in J. Opt. Soc. Am. B Vol. 4, page 977 (1987).

Where a fiber type optical wavelength converter device is constructed of a nonlinear optical material of the type described above, however, the wavelength conversion efficiency of the optical wavelength converter device is not so increased since the crystal is not oriented in such a direction as to be able to utilize the maximum nonlinear optical constants of the material.

The wavelength conversion efficiency of the optical wavelength converter device is longer as the length of the device is larger. The nonlinear optical materials referred to above are however not suitable for making long optical wavelength converter devices because it is difficult to obtain a uniform monocrystal from those nonlinear optical materials.

SUMMARY OF THE INVENTION

In view of the aforesaid drawbacks of the conventional optical wavelength converter devices, it is an object of the present invention to provide an optical wavelength converter module which has a high wavelength conversion efficiency and is capable of easily obtaining a second harmonic in a blue range.

According to the present invention, an optical wavelength converter module comprises a fiber type optical wavelength converter device and a light source device. The optical wavelength converter device includes a core made of a monocrystalline nonlinear optical material (3,5-dimethyl-1-(4-nitrophenyl)-1,2,4-triazole: hereinafter referred to as "TRI") represented by the following molecular diagram:

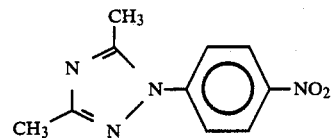

The optical material has a crystal oriented such that the b-axis thereof extends substantially along the axis of said core. The light source device applies, to the optical wavelength converter device, a fundamental which is linearly polarized in the direction of the a-axis or c-axis of said crystal which is normal to the b-axis.

The TRI is disclosed in Japanese Patent Application No. 61-53884. The description of this prior application also states that the TRI has a nonlinear optical effect. However, in actually constructing a fiber type optical wavelength converter device of the TRI, it has not been known how to select crystal orientation and the direction of polarization of a fundamental to be applied to the optical wavelength converter device for higher wavelength conversion efficiency.

The principles according to the present invention for obtaining higher wavelength conversion efficiency by selecting crystal orientation of a nonlinear optical material and the direction in which a fundamental is to be linearly polarized will be described below.

Crystal structures of the TRI are shown in FIGS. 2A, 2B, and 2C. FIG. 3 shows the bulk crystal structure of the TRI. The TRI crystal is of a rhombic system, and its point group is mm2. Therefore, the tensor of the nonlinear optical constants is as follows:

$$d = \begin{pmatrix} 0 & 0 & 0 & 0 & d_{15} & 0 \\ 0 & 0 & 0 & d_{24} & 0 & 0 \\ d_{31} & d_{32} & d_{33} & 0 & 0 & 0 \end{pmatrix}$$

Assuming that optical axes X, Y, Z are determined with respect to crystal axes a, b, c as shown in FIG. 3, $d_{31}$ is a nonlinear optical constant for extracting a second harmonic which is Z-polarized by applying light which is linearly polarized in the direction X (X-polarized light) as a fundamental. Similarly, $d_{32}$ is a nonlinear optical constant for extracting a second harmonic which is Z-polarized by applying light which is linearly polarized in the direction Y (Y-polarized light) as a fundamental. Likewise, $d_{33}$ is a nonlinear optical constant for extracting a second harmonic which is Z-polarized by applying light which is linearly polarized in the direction Z (Z-polarized light) as a fundamental. $d_{24}$ is a nonlinear optical constant for extracting a Y-polarized second harmonic by applying Y- and Z-polarized fundamentals. $d_{15}$ is a nonlinear optical constant for extracting an X-polarized second harmonic by applying X and Z-polarized fundamentals. The magnitudes of the respective nonlinear optical constants will be described below.

Since the refractive index of the TRI is not yet known, the value of $b_{IJK}$ with which a nonlinear optical constant $d_{IJK}$ can be derived according to the following equation:

$$d_{IJK} = N \cdot f_I(2\omega) f_J(\omega) f_K(\omega) \, b_{IJK}$$

where N is the number of molecules per unit volume and $f(\omega)$, $f(2\omega)$ are local field correction factors with respect to the fundamental and the second harmonic, respectively.

| | |
|---|---|
| $b_{31}$ | 1.93 |
| $b_{32}$ | 5.85 |
| $b_{33}$ | 1.26 |
| $b_{15}$ | 1.93 |
| $b_{24}$ | 5.85 |

These values of $b_{IJK}$ are obtained by an X-ray crystal structure analysis and their unit is $[\times 10^{-30} \text{ esu}]$.

It can be seen from the above table that $d_{32}$, $d_{33}$, $d_{24}$, $d_{15}$ can take large values. In filling a core 11 of the TRI in cladding 12 to form a fiber type optical wavelength converter device 10 as shown in FIG. 4, the crystal of the TRI is oriented such that its b-axis (which is the X optical axis) extends in the direction of the core axis (this can be achieved by a method that will be described later on). The above large nonlinear optical constants $d_{32}$, $d_{33}$ can then be utilized by applying, to the optical wavelength converter device 10, a fundamental which is linearly polarized in the direction of the c-axis (which is the Z optical axis) of the crystal or the a-axis (which is the Y optical axis) of the crystal.

For utilizing the nonlinear optical constant $d_{24}$, it is necessary to apply both Y- and Z-polarized fundamentals to the fiber type optical wavelength converter device, and for utilizing the nonlinear optical constant $d_{15}$, it is necessary to apply both X- and Z-polarized fundamentals to the fiber type optical wavelength converter device. Therefore, due to refractive index anisotropy of the TRI, it is difficult to achieve a single mode for higher efficiency. Where the Y- or Z-polarized fundamental is applied to the fiber type optical wavelength converter device, on the other hand, a single mode can sufficiently be accomplished for higher efficiency.

FIG. 5 shows a transmission spectrum of the TRI in a solvent (concentration: $4 \times 10^{-4}$ mol/l, solvent: ethanol). As illustrated in FIG. 5, the TRI does not absorb much light in the vicinity of the wavelength of 400 nm. Therefore, the optical wavelength converter device employing the TRI as the core is capable of generating a second harmonic highly efficiently in a blue range.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 2A, 2B, and 2C are diagrams showing crystal structures of TRI along b-, c-, and a-axes, respectively;

DESCRIPTION OF THE PREFERRED EMBODIMENTS

[1ST EMBODIMENT]

Figure 1:
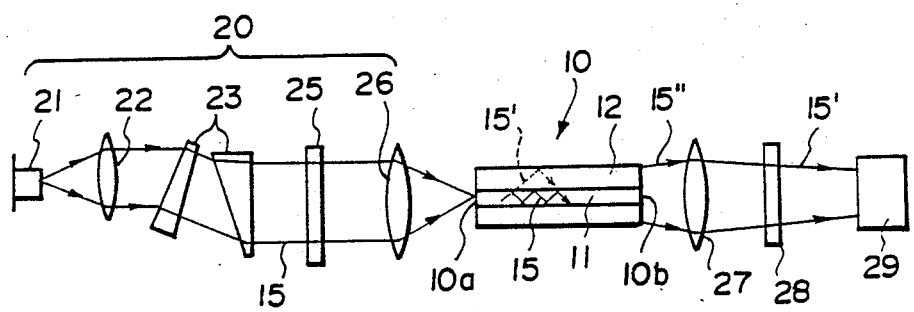
FIG. 1 is a schematic view of an optical wavelength converter module according to a first embodiment of the present invention.
Figure 3:
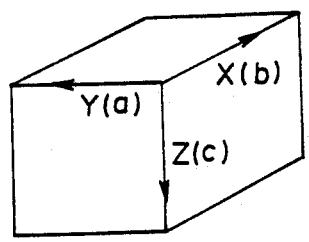
FIG. 3 is a view showing the bulk crystal structure of the TRI.
Figure 4:
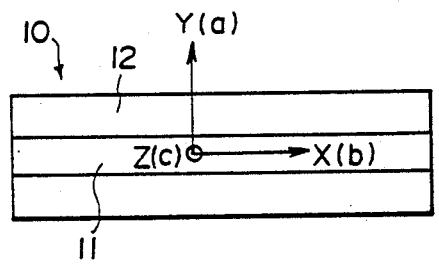
FIG. 4 is a view showing the crystal orientation of the core of an optical wavelength converter device according to the present invention.
Figure 2C:
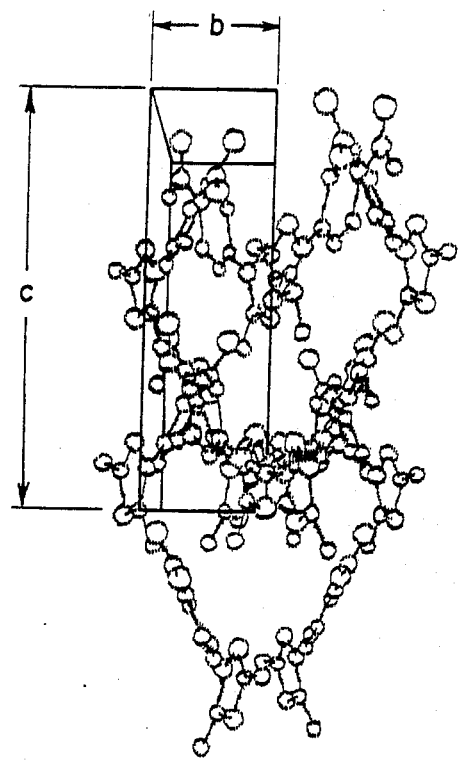
Figure 5:
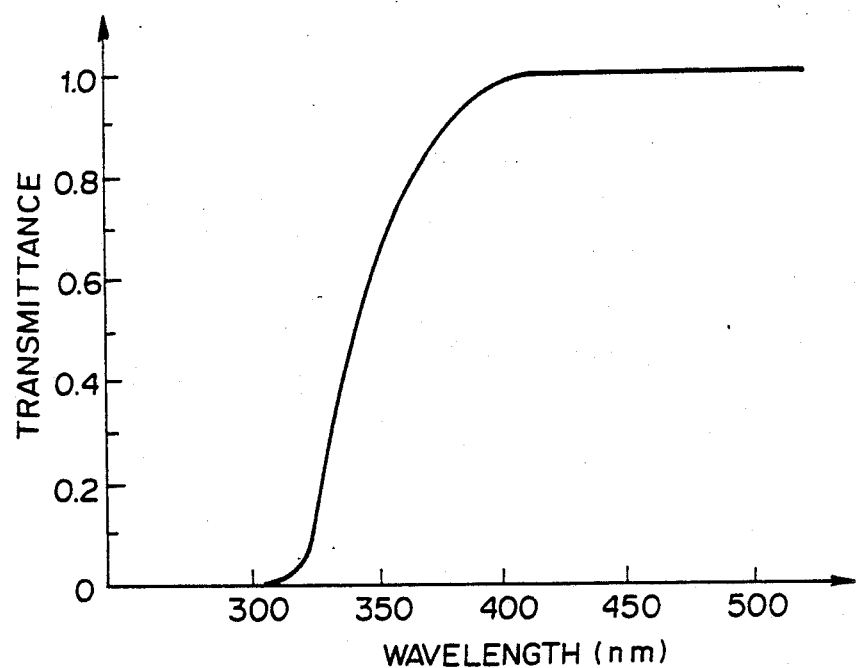
FIG. 5 is a graph illustrating a transmission spectrum of the TRI.

FIG. 1 shows an optical wavelength converter module 10 according to a first embodiment of the present invention. The optical wavelength converter module comprises a fiber type optical wavelength converter device 10 and a light source device 20 for applying a fundamental to the optical wavelength converter device 10.

Figure 6:
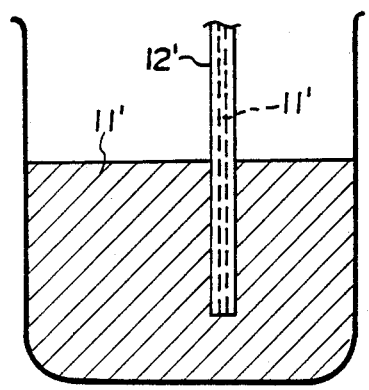
FIG. 6 is a view showing a process of making the optical wavelength converter device of the present invention.

A process of manufacturing the optical wavelength converter device 10 will be described below. A hollow glass fiber 12' (FIG. 6) which will serve as cladding 12 is provided, the hollow glass fiber 12' being made of SFS3 glass, for example and having an outside diameter of about 100 μm and the hollow space therein having a diameter of 6 μm. As shown in FIG. 6, TRI is kept as a molten solution 11' in a furnace or the like, and one end of the glass fiber 12' is immersed in the molten solution 11'. Then, the molten solution 11' of the TRI enters the hollow space in the glass fiber 12' due to capillarity. The molten solution 11' is kept at a temperature slightly higher than the melting point (152° C.) of the TRI in order to prevent this material from being decomposed. Thereafter, the glass fiber 12' is quickly cooled to cause the TRI in the hollow space to be polycrystallized.

Then, the optical fiber 12' is gradually pulled from the furnace which is kept at the temperature (e.g., 153° C.) higher than the melting point of the TRI into an outer space which is kept at a temperature lower than that melting point, for thereby causing the TRI in the melted state to be monocrystallized continuously at the point where it is withdrawn from the furnace. The TRI as it is withdrawn from the furnace is monocrystallized for a range of 50 mm or more, thus forming the core 11 with a uniform crystal orientation. Therefore, the optical wavelength converter device 10 thus formed is sufficiently long. Since the wavelength conversion efficiency of the optical wavelength converter device of this type is proportional to the length of the device, as is well known in the art, the longer the optical wavelength converter device, the greater the practical value of the device. With the TRI filled as a monocrystalline state in the glass fiber 12', the crystal orientation thereof is such that the b-axis (which is the X optical axis) extends along the core axis.

For monocrystallizing the TRI in the above manner, there may be carried out a method which employs a Bridgman furnace as disclosed in Japanese Patent Application No. 61-075078, for example. The glass fiber 12' should be withdrawn at a speed of 5 mm/h, for example.

After the core 11 is filled in the glass fiber 11', the opposite ends of the glass fiber 11' are suitably cut off to complete the optical wavelength converter device 10.

The optical wavelength converter device 10 is combined with the light source device 20, thereby constructing the optical wavelength converter module, as shown in FIG. 1. In the illustrated embodiment, a semiconductor laser 21 is used as a light source for emitting a fundamental. A laser beam (fundamental) 15 having a wavelength of 820 nm emitted from the semiconductor laser 21 is converted by a collimator lens 22 to a parallel-ray beam, which then passes through an anamorphic prism pair 23 and a λ/2 plate 25. The laser beam is thereafter converged by a condensing lens 26 into a beam spot which is applied to an entrance end surface 10a of the optical wavelength converter device 10. As described above, the TRI which the core 11 is made of has such crystal orientation that the X-axis extends along the core axis. In the embodiment, the fundamental 15 which is of a Y-polarized state is applied to the optical wavelength converter device 10 by rotating the λ/2 plate 25 of the light source device 20.

The fundamental 15 that has entered the optical wavelength converter device 10 is then converted to a second harmonic 15' having a wavelength (420 nm) which is ½ of that of the fundamental 15, by the TRI which the core 11 is made of. The second harmonic 15' progresses through the device 10 while repeating total reflection between outer surfaces of the cladding 12, for achieving phase matching between a guided mode in which the fundamental 15 is guided through the core 11 and a radiation mode in which the second harmonic 15' is radiated into the cladding 12 (so-called "Cherenkov radiation").

A beam 15" which is a mixture of the second harmonic 15' and the fundamental 15 is emitted from an exit end surface 10b of the optical wavelength converter device 10. The emitted beam 15" is converged by a condensing lens 27, and then passed through a bandpass filter 28 which allows the second harmonic 15' to pass therethrough while absorbing the fundamental 15. Therefore, only the second harmonic 15' is extracted for use. It was confirmed, using a polarizing plate, that the second harmonic 15' was Z-polarized light. In this embodiment, therefore, a nonlinear optical constant $d_{32}$ of the TRI is utilized. The light intensity of the second harmonic 15' was measured by a light power meter to find the wavelength conversion efficiency. The wavelength conversion efficiency was about 1 % for the input power of 1 W.

[2ND EMBODIMENT]

An optical wavelength converter device according to a second embodiment of the present invention comprises cladding of a glass fiber of SFS8 glass and a core of TRI, the optical wavelength converter device being manufactured in the same conditions as those of the first embodiment. Also in this embodiment, the crystal of the TRI is oriented such that the b-axis extends along the core axis.

A YAG laser beam which was Z-polarized and had a wavelength of 1064 nm was applied as a fundamental to the optical wavelength converter device. It was confirmed that a Z-polarized second harmonic was generated. In this embodiment, therefore, a nonlinear optical constant $d_{33}$ of the TRI is utilized. The wavelength conversion efficiency was about 1 % for the input power of 1 W, as with the first embodiment.

[3RD EMBODIMENT]

An optical wavelength converter device according to a third embodiment of the present invention comprises cladding of a glass fiber of SFS10 glass and a core of TRI, the optical wavelength converter device being manufactured in the same conditions as those of the first embodiment. Also in this embodiment, the crystal of the TRI is oriented such that the b-axis extends along the core axis.

A YAG laser beam which was Y-polarized and had a wavelength of 1064 nm was applied as a fundamental to the optical wavelength converter device. It was confirmed that a Z-polarized second harmonic was generated. In this embodiment, therefore, a nonlinear optical constant $d_{32}$ of the TRI is utilized. The wavelength conversion efficiency was about 1 % for the input power of 1 W, as with the first embodiment.

With the present invention, as described above, the optical wavelength converter module has a very high wavelength conversion efficiency since high nonlinear optical constants of TRI can be utilized in practice for a fiber type nonlinear optical material and the optical wavelength converter device can be of a sufficient length. Inasmuch as the TRI has an absorption end or limit in the vicinity of 400 nm, the optical wavelength converter module can highly efficiently convert a laser beam of a wavelength of about 800 nm applied as a fundamental to a second harmonic in a blue range.

Although certain preferred embodiments have been shown and described, it should be understood that many changes and modifications may be made therein without departing from the scope of the appended claims.

We claim:

1. An optical wavelength converter module comprising:
   (i) an optical wavelength converter device composed of cladding and a core filled in said cladding, said core being made of a monocrystalline nonlinear optical material represented by the following molecular diagram:

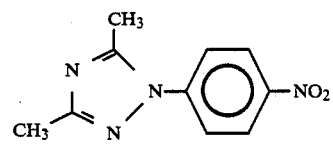

said optical material being of a crystal which is a rhombic system with three orthogonal axes a, b and c of the crystal being defined such that their lengths are in the order of a>c>b, and having a crystal oriented such that the b-axis thereof extends a crystal oriented such that the b-axis thereof extends substantially along the axis of said core; and
   (ii) a light source device for applying, to said optical wavelength converter device, a fundamental which is linearly polarized in the direction of the a-axis or c-axis of said crystal which are normal to said b-axis.

2. An optical wavelength converter device according to claim 1, wherein said cladding is made of SFS3 glass.

3. An optical wavelength converter device according to claim 1, wherein said cladding is made of SFS8 glass.

4. An optical wavelength converter device according to claim 1, wherein said cladding is made of SFS10 glass.

5. An optical wavelength converter module comprising:

(i) an optical wavelength converter device composed of cladding and a core filled in said cladding, said core being made of a monocrystalline nonlinear optical material represented by the following molecular diagram.

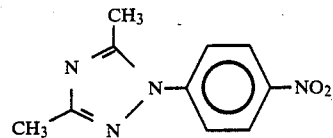

said optical material having a crystal oriented such that the b-axis thereof extends substantially along the axis of said core; and (ii) a light source device for applying, to said optical wavelength converter device, a fundamental which is linearly polarized in the direction of the a-axis of c-axis of said crystal which are normal to said b-axis.

6. An optical wavelength converter device according to claim 5, wherein said cladding is made of SFS3 glass.

7. An optical wavelength converter device according to claim 5, wherein said cladding is made of SFS8 glass.

8. An optical wavelength converter device according to claim 5, wherein said cladding is made of SFS10 glass.

* * * * *